United States Patent
Clark et al.

(10) Patent No.: US 10,118,564 B2
(45) Date of Patent: Nov. 6, 2018

(54) CARGO BOX WITH AERODYNAMIC TEXTURED SURFACE

(71) Applicant: Thule Sweden AB, Hillerstorp (SE)

(72) Inventors: Frederic Clark, Woodbury, CT (US); Timothy Makris, Sandy Hook, CT (US); Joe Settelmayer, McKinleyville, CA (US); John Laverack, Southbury, CT (US); Gregor Weaver, Waterbury, CT (US); Kevin Bogoslofski, Southington, CT (US); Ian McLeran, Woodbury, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/426,932

(22) PCT Filed: Sep. 10, 2013

(86) PCT No.: PCT/US2013/059063
§ 371 (c)(1),
(2) Date: Mar. 9, 2015

(87) PCT Pub. No.: WO2014/043128
PCT Pub. Date: Mar. 20, 2014

(65) Prior Publication Data
US 2015/0224940 A1 Aug. 13, 2015

Related U.S. Application Data

(60) Provisional application No. 61/699,746, filed on Sep. 11, 2012.

(51) Int. Cl.
*B60R 9/05* (2006.01)
*B60R 9/055* (2006.01)

(52) U.S. Cl.
CPC ............... *B60R 9/05* (2013.01); *B60R 9/055* (2013.01)

(58) Field of Classification Search
CPC .................................. B60R 9/05; B60R 9/055
(Continued)

(56) References Cited

U.S. PATENT DOCUMENTS 2,261,558 A * 11/1941 Orloff .................... B64C 21/02
114/67 R
4,742,944 A * 5/1988 Iida ........................ B60R 9/048
224/316

(Continued)

FOREIGN PATENT DOCUMENTS

JP 2001 050215 2/2001
WO WO 1999/24749 5/1999
WO WO 2012/047452 4/2012

OTHER PUBLICATIONS

International Search Report and Written Opinion of the International Searching Authority for International Appl. No. PCT/US2013/059063, European Patent Office, Rijswijk, Netherlands, dated Dec. 13, 2013, 10 pages.

(Continued)

*Primary Examiner* — Derek Battisti
(74) *Attorney, Agent, or Firm* — Sterne, Kessler, Goldstein & Fox P.L.L.C.

(57) ABSTRACT

A cargo box attachable to a vehicle that includes a cover shell having a textured portion that lessens aerodynamic drag on the combination of the vehicle and cargo box.

17 Claims, 5 Drawing Sheets

(58) Field of Classification Search
USPC .......................................................... 224/316
See application file for complete search history.

(56) References Cited

U.S. PATENT DOCUMENTS

| | | | | |
|---|---|---|---|---|
| 5,171,623 A * | 12/1992 | Yee | ............................ | B63B 1/34 |
| | | | | 114/288 |
| 5,282,560 A * | 2/1994 | Ozog | ................... | B62D 35/007 |
| | | | | 224/309 |
| 5,378,524 A * | 1/1995 | Blood | ..................... | F42B 7/046 |
| | | | | 114/288 |
| 6,276,636 B1 * | 8/2001 | Krastel | .................. | B62D 35/00 |
| | | | | 244/130 |
| 6,634,700 B1 * | 10/2003 | Calvert | ................... | B62D 35/00 |
| | | | | 296/180.1 |
| 7,328,770 B2 * | 2/2008 | Owens | .................... | F16F 7/006 |
| | | | | 181/207 |
| 7,922,235 B1 * | 4/2011 | Smith | ................... | B62D 35/005 |
| | | | | 296/180.1 |
| 8,382,194 B2 * | 2/2013 | Wood | .................... | B62D 35/001 |
| | | | | 296/180.4 |
| 8,852,710 B2 * | 10/2014 | Evans | ..................... | B62D 35/00 |
| | | | | 296/180.1 |
| 8,985,676 B2 * | 3/2015 | Orellano | ......................... | 244/130 |
| 2003/0234268 A1 * | 12/2003 | Kubina | ..................... | B60R 9/05 |
| | | | | 224/309 |
| 2009/0308902 A1 * | 12/2009 | Rex | ........................... | B60R 9/08 |
| | | | | 224/315 |
| 2010/0090496 A1 | 4/2010 | Carlson | | |

OTHER PUBLICATIONS

Thule Force M Medium Car Roof Rack Cargo Box Luggage Carrier 624 Installation Video at 0:20 minute mark, published by RackWarehouse.com on YouTube, Jan. 30, 2013. Retrieved May 2, 2017. https://www.youtube.com/watch?v=HEkta-71CSo.

* cited by examiner

CARGO BOX WITH AERODYNAMIC TEXTURED SURFACE

FIELD

The instant disclosure relates to cargo carriers. In particular, the disclosure relates to cargo boxes mounted or attached to a vehicle or other moving object.

BACKGROUND

Movement of cargo, especially movement of cargo by individuals, may involve a cargo box attachable to a carrying vehicle or other moving object. For various reasons, it is sometimes desirous to carry more cargo in a vehicle than the vehicle is designed to carry. In other instances, it may be desirous to carry cargo in a vehicle, but keep normal cargo carrying spaces of the vehicle at less than full capacity.

Whatever the reasons, cargo boxes with space for carrying cargo are often attached to vehicles. Cargo boxes may be convenient in that they allow additional carrying space, but they can also add additional drag to the vehicle or moving object to which the box is attached. In the case of vehicle cargo boxes, the added drag has the potential to decrease the fuel efficiency of the vehicle, the maneuverability of the vehicle and/or otherwise affect the performance of the vehicle.

Thus, there is a need for a cargo box attachable to a vehicle or other moving object that can reduce (minimize) the amount of added drag on the vehicle or object caused by the box.

BRIEF DESCRIPTION OF THE DRAWINGS

Implementation of the present application will now be described, by way of example only, with reference to the attached Figures, wherein.

DETAILED DESCRIPTION

Figure 1:
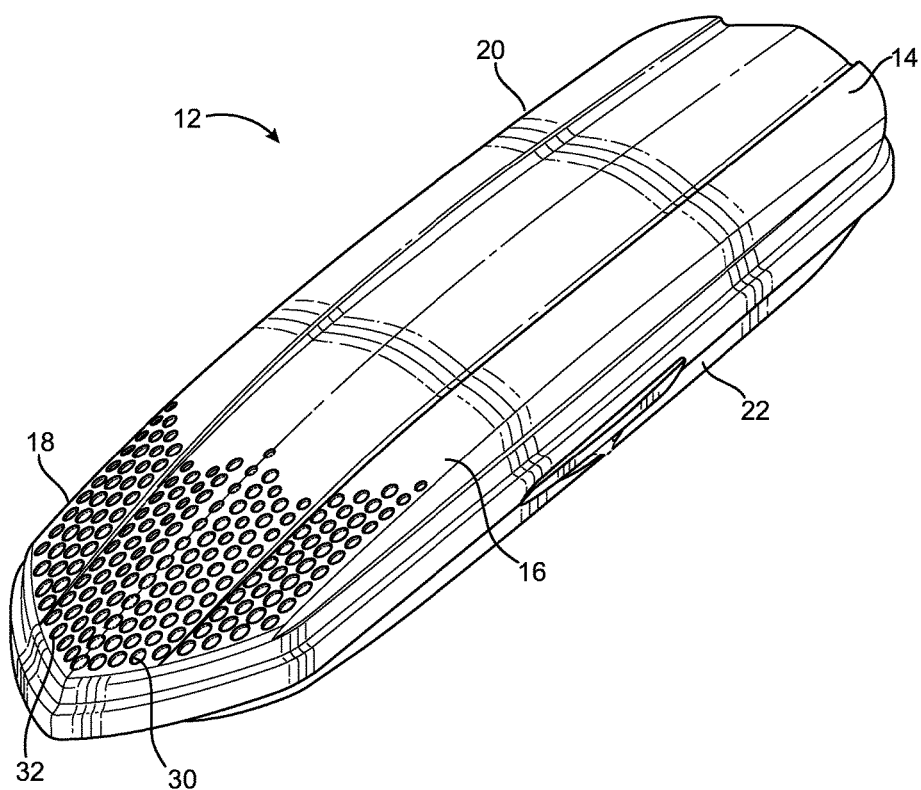
FIG. 1 is a perspective view of a cargo box having an aerodynamic-potentiated portion in accordance with an exemplary implementation.

It will be appreciated that for simplicity and clarity of illustration, where appropriate, reference numerals have been repeated among the different Figures to indicate corresponding or analogous elements. In addition, numerous specific details are set forth in order to provide a thorough understanding of the implementation described herein. However, it will be understood by those of ordinary skill in the art that the implementation described herein may be practiced without these specific details. In some instances, methods, procedures and components may not be described in details so as not to obscure related relevant information being described. Also, the description in the specification should not be considered as limiting the scope of the implementation described herein.

The present disclosure presents a cargo box for attachment to a vehicle or other moving object and capable of carrying cargo. The cargo box may be attached to the vehicle at any point on the vehicle and by any means known in the art. The cargo box may be connected to the vehicle or moving object by means known to those skilled in the art. The connection means may include, but is not limited to, bolts, clamps, straps or other mechanical attachment means. The cargo box may be attached directly to the vehicle or moving object, or may be attached to an intermediary clasp, element or elements that are then attached to the vehicle or moving object. Most typically, the cargo box is connected to the carrying vehicle by way of a roof top mounted carrier rack that has rails running along lateral sides of the vehicle, parallel to the vehicle's long axis, and crossbars or load bars connected therebetween in a substantially perpendicular orientation to the rails. Normally, the bottom of the cargo box will be provided with clamp or similar type devices used to attach the cargo box to a pair of crossbars of the rack.

FIG. 1 illustrates a perspective view of a cargo box 12 having a cover shell 14 with an outer surface 16 including an aerodynamic-potentiated textured portion 18. The cargo box 12 shown in FIG. 1 has a top surface 20, a first side wall 22, a second side wall 24, a rear wall 26 (not shown) and a base 28 (not shown). In use, the cargo box 12 is attaches to a vehicle or other moving objects. Typically the base 28 is attached to the vehicle or moving object. However, the cargo box may be attached by the cover shell or other means.

The cargo box shown in FIG. 1 has a generally elongated scaphoid shape. Those skilled in the art, however, will recognize that the cargo box 12 may be otherwise shaped. Likewise, although the cover shell 14 of the cargo box 12 in FIG. 1 is made up of a single element, those skilled in the art will recognize that the cover shell 14 may, in practice, include more than one element which combine together to form the cover shell 14. The aerodynamic-potentiated textured portion 18 in FIG. 1 is, by way of example only, provided with elliptical "dimples" 30 arranged on a portion of the top surface 20 of the cover shell 14.

Figure 2:
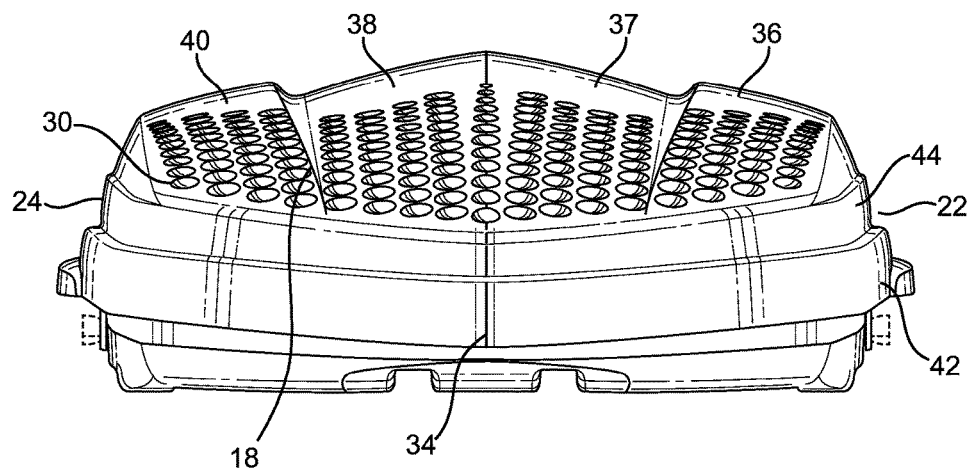
FIG. 2 is a front elevation view of the cargo box illustrated in FIG. 1.
Figure 3:
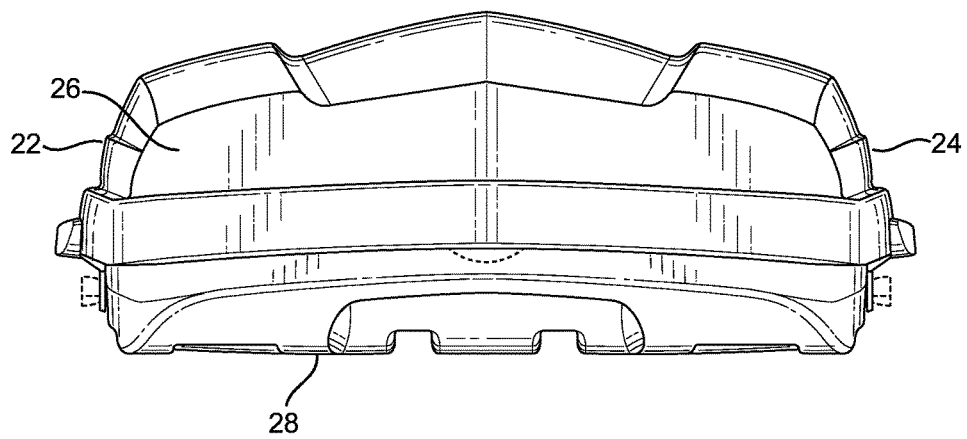
FIG. 3 is a rear elevation view of the cargo box illustrated in FIG. 1.

FIG. 2 is a front elevated view of the cargo box shown in FIG. 1. In FIG. 2 the first side wall 22 and the second side wall 24 taper inward to meet along front edge 34. FIGS. 2 and 3 both show that the top surface 20 is comprised of multiple surfaces 36, 37, 38 and 40. Likewise, FIG. 2 shows side walls 22, 24 comprise multiple surfaces 42, 44. One skilled in the art will recognize that the top 20 and the side walls 22, 24 may each consist of one single surface or each may include multiple surfaces which combine to form the top surface 20, and/or the side walls 22, 24.

Figure 4:
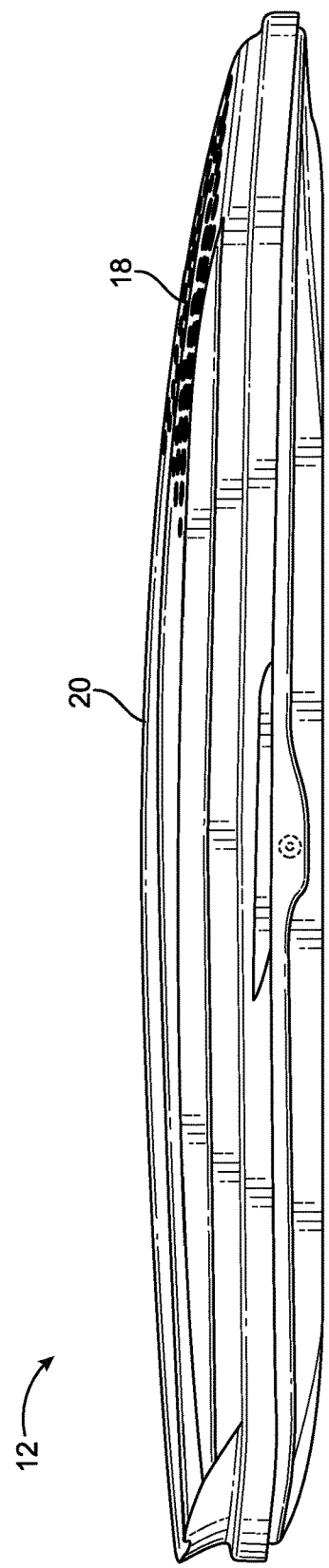
FIG. 4 is a side elevation view of the cargo box illustrated in FIG. 1.
Figure 5:
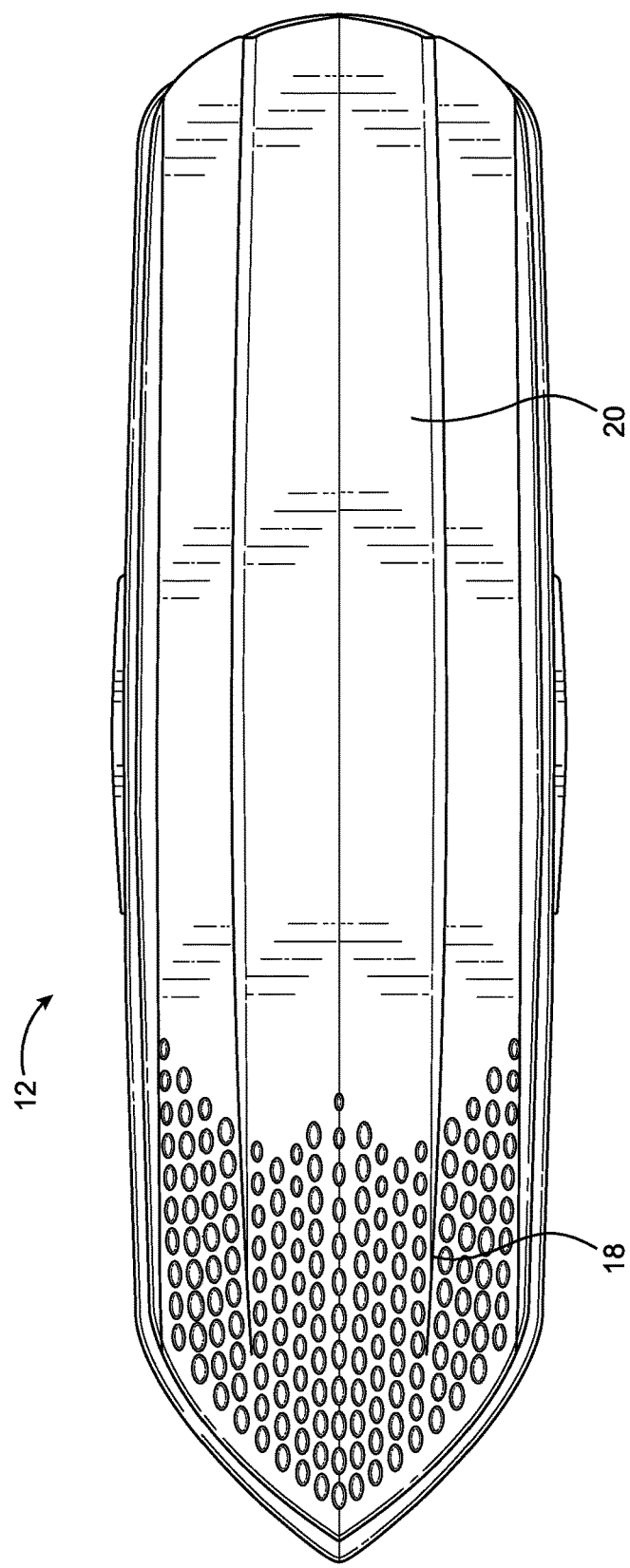
FIG. 5 is a top plan view of the cargo box illustrated in FIG. 1.

FIG. 3 is rear elevational view of the cargo box of FIG. 1. FIG. 3 shows the top 20 in a general cross sectional arched shape. One skilled in the art will recognize that the top 20 of cargo box 12 may be shaped differently within the spirit of the invention. FIG. 4 is a side elevational view of the cargo box of FIG. 1. FIG. 5 is a top plan view of the cargo box FIG. 1.

For purposes of this disclosure, a reoccurring recess into the outer surface 16 of the cover shell 14 is considered a "dimple". The shape of the dimple is considered to be the general shape of the perimeter of the recess where it forms a juncture with the outer surface 16 of the cover shell 14. The dimple recess shape is the shape of the dimple down into the recess itself. The dimple depth being the general measurement of the maximum point into which the recess extends into the cover shell 14.

The elliptical dimples 30 in FIG. 1 are arranged, by way of example only, in a pattern of longitudinal rows 32 of varying lengths and with the major axis of the elliptical dimples in line with the rows. Although, the dimples of the textured portion 18 in FIG. 1 are all elliptical, the dimple shape, dimple recess shape and dimple depth vary.

One skilled in the art, however, will recognize that aerodynamic-potentiated texture may be made up of dimples of different dimple shapes, dimple recess shapes and dimple depths. Even an individual aerodynamic-potentiated textured portion may include dimples of multiple dimple shapes, dimple recess shapes and dimple depths. In addition to elliptical, dimple shapes include, but are not limited to, circular, triangular, obround, diamond, and deltoid. The dimple recess shape may be, but is not limited to, tetrahedron, cuboid, prism, pyramid, pyramid frustum, obelisk, wedge, spherical segment, ellipsoid segment, catenoid, paraboloid, cylinder, cone, disk or combination of such shapes. The dimples of an individual aerodynamic-potentiated portion may have varying dimple depths. An individual aerodynamic-potentiated portion may also include multiple areas in which the aerodynamic-potentiated dimples are arranged in varying patterns.

As shown in FIG. 1, the aerodynamic-potentiated textured portion 18 of the cover shell may be limited to the top surface 20 of the cover shell 14 or may include the side walls 22, 24. Likewise, the textured portion could be limited to the side walls 22, 24 and not extend to the top surface 20.

The aerodynamic-potentiated portion 18 of the outer surface 16 of the cover shell 14 may be made up of outwardly projecting protrusions instead of recessed dimples. The protrusions consist of projections from the outer surface 16 of the cover shell 14. The protrusion shape is taken to be the shape of the perimeter of the projection at its juncture with the outer surface of the cover shell. The protrusion projection shape being the shape of the projection itself and the protrusion height being the maximum distance the projection extends from the outer surface of the cover shell.

The protrusion shapes may be, but are not limited to, elliptical, circular, triangular, obround, diamond, and deltoid. The protrusion projection shape may be, but is not limited to, tetrahedron, cuboid, prism, pyramid, pyramid frustum, obelisk, wedge, spherical segment, ellipsoid segment, catenoid, paraboloid, cylinder, cone, disk or combination of such shapes. The protrusion of an individual aerodynamic-potentiated portion may have varying protrusion heights. An individual aerodynamic-potentiated portion may also include multiple areas in which the aerodynamic-potentiated protrusions are arranged in varying patterns.

An aerodynamic-potentiated textured portion may include both dimples and protrusions and may be made up of dimples of different dimple shapes and dimple depth and protrusions of different projections shapes and projection heights.

The surface of the dimples and/or protrusions themselves may be textured or untextured. Additionally, the aerodynamic-potentiated portion may include textured and untextured dimples, textured and untextured protrusions, textured dimples and textured protrusions, untextured dimples and textured protrusions, textured dimples and untextured protrusions.

Figure 6:
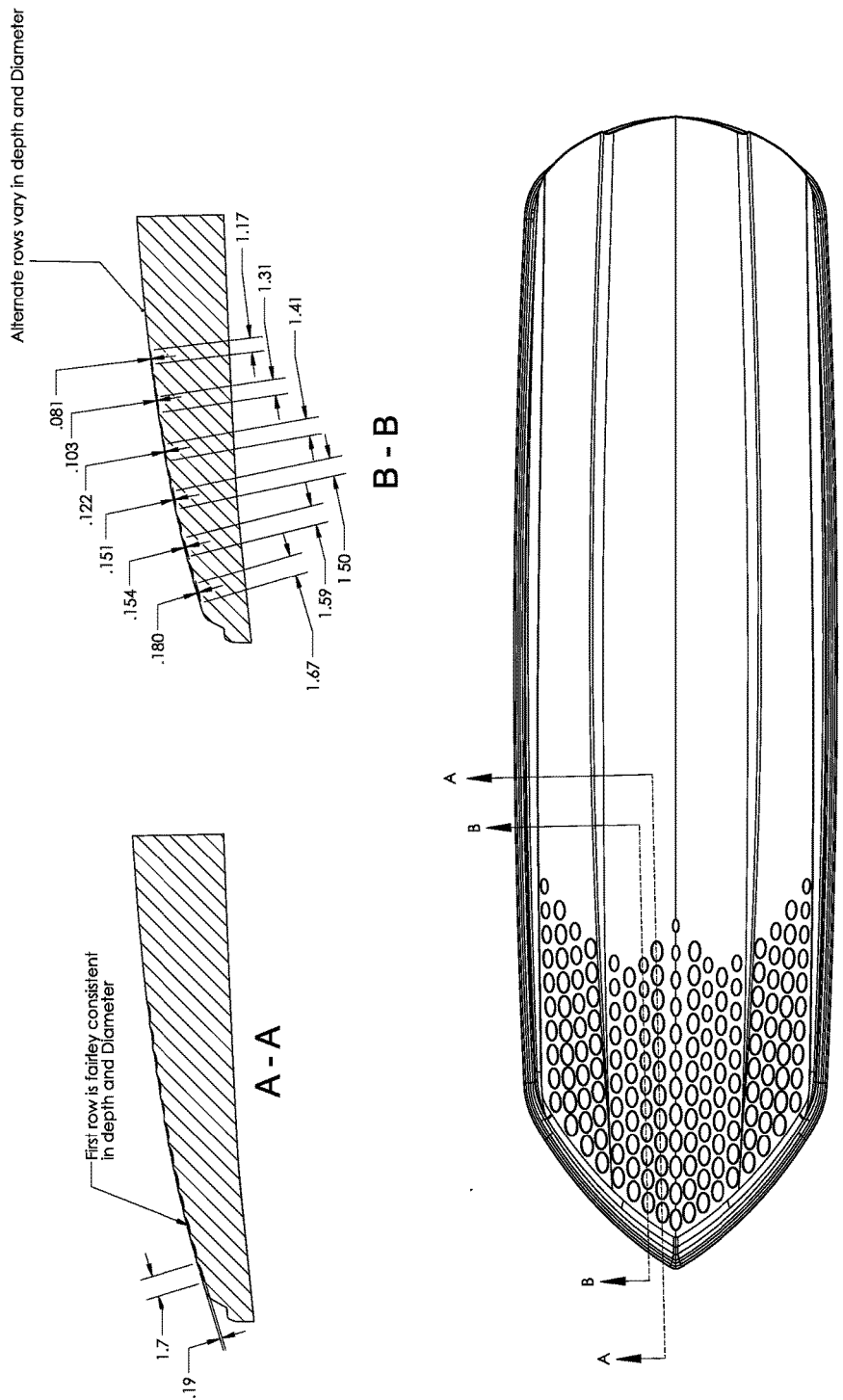
FIG. 6 is a top plan view of the cargo box showing a dimple pattern, and providing two cross-sections along the line A-A and B-B which depict details of adjacent rows of dimples.

FIG. 6, in a lower portion thereof, depicts the dimple pattern illustrated in FIG. 5, but adds the cross-sectional views taken along lines A-A and B-B. As shown, the longitudinal centerline of the cargo box provides an axis of symmetry about which the dimple pattern is centered. A row of generally elliptically shaped dimples is provided along the centerline, which is peaked as shown, at least in the front, textured portion. Running from the front end of the cargo box (left end in FIG. 6) toward the back end, the centerline dimples get progressively smaller. In each of the two rows adjacent to the centerline of dimples, is a row of substantially like dimples. This pattern is shown in cross-section A-A in which each of the aligned elliptically shaped dimples has a long axis that is about 1.7 inches long and a recess depth of approximately 0.19 inches. The next row of dimples, moving laterally outward on each side of the centerline is a row of dimples depicted in the cross-section taken along line B-B. In these rows, the elliptically shaped dimples get increasingly smaller from a long axis of about 1.67 inches to about 1.17 inches. Over the same range, the depth of the recesses or dimples decreases from about 0.18 inches to about 0.081 inches. Moving outwardly toward the lateral side of the cargo box, the next row of dimples is of the type depicted in the cross-section along line A-A, then as a long line B-B, then has a long line A-A and so on until the lateral side of the cargo box is encountered. As depicted in FIG. 6, there are eight rows running alongside the center row on each side thereof, in a substantial mirror pattern. Surprisingly, utilizing Computational Fluid Dynamics (CDF) analysis, the pattern described above and depicted in FIG. 6 produced an approximately 20% reduced drag force compared to an untextured (no dimples) version of the cargo box; i.e. 2.1 lbf (dimpled) versus 2.6 lbf (non-dimpled).

It has also been learned that the sharper the nose of the cargo box, the less drag it will induce on the carrying vehicle as well. Still further, it has been similarly learned that utilizing a substantially flat bottom surface on the cargo box also produces less drag than one that is of highly variable shape. Taken together, a sharp nosed cargo box, having a substantially flat bottom surface and at least a portion of the top surface dimpled similar as depicted in FIG. 6 will produce even heightened degrees of drag savings.

Exemplary implementations have been described hereinabove regarding the implementation of a cargo box. Various modification to and departures from the disclosed implementation will occur to those having skill in the art. The subject matter that is intended to be within the spirit of this disclosure is set forth in the following claims.

What is claimed is:

1. A cargo box mountable to a carrying vehicle, comprising:
   a base configured to be mounted to the carrying vehicle; and
   a cover shell with an inner surface and an outer surface,
   wherein the cover shell is attachable to the base with the inner surface of the cover shell and the base forming an interior cargo space,
   wherein a front portion of the outer surface of the cover shell includes an aerodynamic-potentiated textured portion having a plurality of elliptically shaped recessed dimples formed into the outer surface of the cover shell,
   wherein a first end of each elliptically shaped recessed dimple is curved and a second end opposite the first end is curved,
   wherein the dimples have a depth extending into the cover shell and are arranged in a pattern having a plurality of rows extending from the front portion of the outer surface of the cover shell toward a rear portion of the outer surface of the cover shell,
   wherein each elliptically shaped recessed dimple is symmetrical about two axes, and wherein at least one row of dimples progressively decreases in diameter and depth as the row extends from the front portion to the rear portion of the cover shell.

2. The cargo box of claim 1, wherein the dimples are arranged in a symmetrical pattern.

3. The cargo box of claim 1, wherein the cover shell has a rear portion and is substantially scaphoid shaped, with the substantially scaphoid shaped cover shell having a top, a first side wall, a second side wall, and a rear wall, with the first side wall and the second side wall extending downward from the top and extending outward from the rear wall at the rear portion of the cover shell so as to converge at the front portion of the cover shell, the first side wall and the second side wall being substantially parallel in the rear portion of the cover shell.

4. The cargo box of claim 3, wherein the textured portion of the outer surface of the cover shell is on the top of the cover shell.

5. The cargo box of claim 1, further comprising a drag-reducing, peaked nose at a front end of the cargo box.

6. The cargo box of claim 1, further comprising a drag-reducing, substantially flat bottom surface.

7. The cargo box of claim 6, further comprising a drag-reducing, peaked nose at a front end of the cargo box thereby establishing a synergistically aerodynamically potentiated cargo box having a reduction in drag greater than the individual reductions in drag produced separately by the three features of surface texturing, peaked nose and a substantially flat bottom surface.

8. A cargo box mountable to a vehicle comprising:
a base having a substantially flat bottom surface, wherein the base is configured to be mounted to the vehicle; and
a cover shell comprising:
an outer surface having a top surface, a front portion, a rear portion, a first sidewall, and a second sidewall;
an inner surface; and
a plurality of recessed dimples having a long-axis and a depth formed in the front portion of the outer surface of the cover shell,
wherein the recessed dimples are arranged in a pattern having a first longitudinal row and a second longitudinal row,
wherein the first longitudinal row comprises dimples having the same length long-axis and the same depth,
wherein the second longitudinal row comprises a first dimple and a second dimple disposed rearward of the first dimple, wherein a long-axis and a depth of the second dimple are shorter than the first dimple, and
wherein the cover shell is configured to attach to the base such that the inner surface of the cover shell and the base define an interior cargo space.

9. The cargo box of claim 8, wherein the plurality of the dimples are elliptically shaped and arranged on the top surface of the cover shell.

10. The cargo box of claim 8, wherein the first sidewall and the second sidewall extend downward from the top surface of the cover shell and taper toward one another in the front portion of the cover shell.

11. The cargo box of claim 10, wherein the dimples are formed in the top surface, the first sidewall, and the second sidewall of the front portion of the cover shell.

12. The cargo box of claim 8, wherein the long-axis of the first row of dimples is about 1.7 inches and the depth is about 0.19 inches, and wherein the long-axis of the second row of dimples is about 1.67 inches to about 1.17 inches and the depth is about 0.18 inches to about 0.081 inches.

13. The cargo box of claim 8, wherein the dimples reduce a drag force on the cargo box by approximately 20 percent in comparison to an untextured cargo box.

14. The cargo box of claim 8, wherein the second longitudinal row comprises a third dimple disposed rearward of the second dimple, wherein a long-axis and a depth of the third dimple are shorter than the second dimple.

15. A cargo box mountable to a carrying vehicle, comprising:
a base configured to be mounted to the carrying vehicle; and
a cover shell with an inner surface and an outer surface,
wherein the cover shell is attachable to the base with the inner surface of the cover shell and the base forming an interior cargo space,
wherein a front portion of the outer surface of the cover shell includes an aerodynamic-potentiated textured portion having a plurality of elliptically shaped recessed dimples formed into the outer surface of the cover shell,
wherein the dimples have a depth extending into the cover shell and are arranged in a pattern having a plurality of rows extending from the front portion of the outer surface of the cover shell toward a rear portion of the outer surface of the cover shell, and
wherein at least one row of dimples progressively decreases in diameter and depth as the row extends from the front portion to the rear portion of the cover shell.

16. The cargo box of claim 15, wherein each elliptically shaped recessed dimple forms a plane curve with a locus of points for which the sum of the distances from each point to two fixed points is equal.

17. The cargo box of claim 15, wherein a first end of each elliptically shaped recessed dimple is curved and a second end opposite the first end is curved.

\* \* \* \* \*